July 26, 1927.                                                          1,637,167
F. WECKERLE
ELECTRICAL HEATING BODY FOR HIGH TEMPERATURES ESPECIALLY FOR CERAMIC
METALLURGICAL PROCESSES AND CHEMICAL PROCESSES
Filed Aug. 24, 1925

Inventor:
Ferdinand Weckerle
by
Attorney.

Patented July 26, 1927.

1,637,167

UNITED STATES PATENT OFFICE.

FERDINAND WECKERLE, OF MUNICH, GERMANY, ASSIGNOR TO STUDIENGESELL-
SCHAFT FUER WIRTSCHAFT U. INDUSTRIE, M. B. H., OF MUNICH, GERMANY.

ELECTRICAL HEATING BODY FOR HIGH TEMPERATURES ESPECIALLY FOR CERAMIC
METALLURGICAL PROCESSES AND CHEMICAL PROCESSES.

Application filed August 24, 1925, Serial No. 52,198, and in Germany August 28, 1924.

It is well known how to produce heat by means of the resistance of nickel chrome and platine wires. While nickel chrome is practically only to be employed unto 900° Celsius platine will permit of temperature unto 1200° and even momentarily unto 1400°, which latter temperature however must be limited only to short intervals. In the electric arc of course temperatures unto 4000° may be produced. In the usual electric ovens the electric arc is employed in such a manner that the radiant heat of the arc is used. In metallurgical processes the arc is also used in substituting the melting metal for a pole and in establishing the arc by means of the carbon electrode between metal and coal. The radiant heat of the arc will furnish heat enough it is true, but this heat is limited to a very small space. Besides the burning of the electrode carbon will produce reducing gases which are by no means desirable for all processes.

This arrangement although useful for producing high temperatures, is troublesome by reason of the presence of said gases and this to such an extent that for many processes, where a neutral atmosphere is required, the heating with the arc cannot be employed. Especially in the ceramic and various metallurgical processes a heating body is needed which is free from such defects and which allows temperatures up to 1600°.

It is well known also that at certain high temperatures many nonconductors will become conductors and in this connection reference is made to the various inventions of Professor Nernst relating to the conductibility of metallic oxides of high temperatures. But these metallic oxides are likewise not suited for such heating bodies because at the moment of their conductibility a rapid sublimating will occur and therefore a rapid destruction. Also the manufacturing of these conductors is in this case very troublesome and expensive. It is the purpose of the present invention to furnish means for producing temperatures of 500° to 1800°.

The present invention employs glass producing silicates for such second-class conductors, the melting point of which can be determined by adding suitable melting means, or by adding conducting bodies such as finely pulverized metals.

Figure 1:
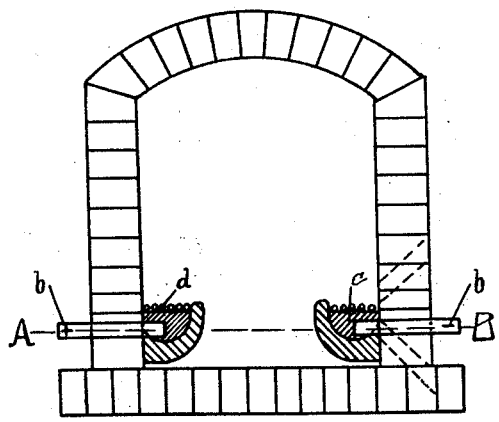
Figure 3:
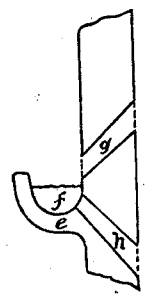
Figure 2:
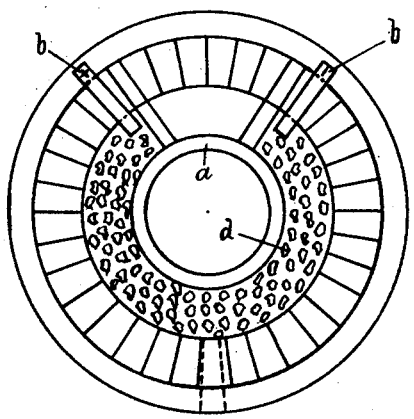
Figure 4:
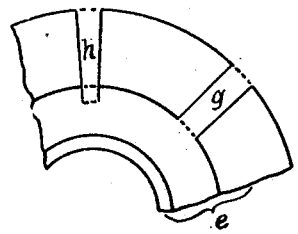

In the annexed drawings Fig. 1 is a longitudinal section and Fig. 2 a cross-section, on the line A—B of Fig. 1, of an electrical oven of a well known form, and Fig. 3 and Fig. 4 are fragmentary views illustrating details of construction. The silicates mentioned in the above are poured into suitable fireproof and open gutters $a$ and are melted by means of the electric arc. The current is admitted through the black-lead-electrodes $b$. In order to convert the second-class conductor $c$ which might have been cooled down already and have become a nonconductor small coal $d$ is strewn on to the surface and current is admitted. The small coal $d$ acts now as conductor and gives the main part of its heat to the second-class conductor and this conductor when it begins to become fluid will automatically form a portion of a circuit. By the gradual burning of the small coal the required heat will be produced by the second-class conductor. By means of the mixtures as mentioned in the above temperatures will be produced which reach up to the evaporating heat of said silicates. The composition of the mixtures depends as much on the required temperatures as on the available nature, intensity and power of electric current.

The said silicates are to be preferred to the chlorides which have similar properties, because the chlorides cannot endure higher temperatures than 1200° and with the direct current an electrolytic decomposition is to be feared.

With the usual electrical ovens the changing of a heating resistance in the oven is generally not possible. This change however may only be effected in such a way that the intensity is lowered, whereby also the amperes and also the kilowatt will become less, or that the amperes are increased by increasing the intensity.

If with direct current the dynamo is placed near the oven and is only employed for furnishing the current the process will be very simple. But as this case very seldom exists and the electric ovens are mostly depending on electric power works there is no other way for changing the intensity with the direct current than to employ a transformer or resistances.

Therefore in both cases great losses of energy must be taken into account. With alternating current only adjustable transformers can be employed which work to better advantage with regard to the electric output but require greater expenses of installation. With regard to Fig. 3 and Fig. 4 the gutter $e$ is filled with the liquid heating resistance $f$ and this heating resistance if the current is admitted will give its heat to the inside of the oven. If we suppose that a greater heat should be required a further substance is introduced in powdered or granulated state through the openings $g$ into the gutter $e$. This substance, at first solid, becomes liquid and conductive and increases in this way the whole cross section of the heating resistance. It follows now that the resistance in ohms lessens and the amperes increase.

In order to lessen again the amperes so much of the liquid heating resistance is drawn off at the outlet $h$ that the cross section is decreased and the required resistance in ohms is attained and the amperes reduced to the desired amount.

By this proceeding the best possible regulation is obtained. This kind of regulation has the advantage that not only no apparatus like transformers, resistances and the like are needed, but also no additional switches are used which with high currents may occasion the forming of light arcs.

To this a third advantage is to be added, to wit, the regulating of the heating current is made without sudden variations thereby avoiding danger of any detrimental effect on the power works.

What I claim is:

In an electric furnace, an open gutter for receiving a heating body of silicate adapted to be reduced by heat to a liquid conductor, and taps communicating with said gutter and extending into said liquid body to permit of the volume thereof being changed at will to vary its resistance.

In testimony whereof I affix my signature.

FERDINAND WECKERLE.